(12) United States Patent
Hara

(10) Patent No.: US 7,806,022 B2
(45) Date of Patent: Oct. 5, 2010

(54) BICYCLE COMPONENT ACTUATING DEVICE

(75) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 725 days.

(21) Appl. No.: 11/749,245

(22) Filed: May 16, 2007

(65) Prior Publication Data

US 2008/0282830 A1    Nov. 20, 2008

(51) Int. Cl.
    *F16C 1/10*    (2006.01)
(52) U.S. Cl. ...................................... 74/502.2
(58) Field of Classification Search ............... 74/500.5, 74/501.6, 502.2, 519; 280/275, 276; 188/285
    See application file for complete search history.

(56) References Cited

U.S. PATENT DOCUMENTS

| | | | |
|---|---|---|---|
| 4,428,180 A | * | 1/1984 | Carlson ...................... 56/11.3 |
| 4,872,696 A | * | 10/1989 | Gill .......................... 280/281.1 |
| 5,275,264 A | * | 1/1994 | Isella ....................... 188/299.1 |
| 5,775,168 A | | 7/1998 | Furuta |
| 5,802,923 A | | 9/1998 | Hara |
| 5,862,709 A | | 1/1999 | Kageyama |
| 6,209,413 B1 | | 4/2001 | Chang |
| 6,450,060 B1 | | 9/2002 | Shahana |
| 6,729,203 B2 | | 5/2004 | Wesling et al. |
| 6,767,024 B1 | | 7/2004 | Kuo |
| 6,848,335 B1 | | 2/2005 | Kawakami |
| 7,146,874 B2 | | 12/2006 | Shahana et al. |
| 7,194,928 B2 | | 3/2007 | Kawakami |
| 2005/0103149 A1 | | 5/2005 | Hunt et al. |
| 2005/0126329 A1 | | 6/2005 | Blaschke |
| 2005/0252330 A1 | | 11/2005 | Denk |
| 2005/0269178 A1 | | 12/2005 | Huang |

FOREIGN PATENT DOCUMENTS

| | | |
|---|---|---|
| DE | 9212927 U1 | 11/1992 |
| DE | 19532088 A1 | 3/1997 |
| DE | 20 2006 005454 U1 | 6/2006 |
| EP | 0768234 A1 | 4/1997 |
| EP | 0816217 A2 | 1/1998 |
| EP | 1 129 937 A2 | 9/2001 |
| EP | 1 992 556 A1 | 11/2008 |

* cited by examiner

*Primary Examiner*—Vicky A Johnson
(74) *Attorney, Agent, or Firm*—Global IP Counselors, LLP

(57) ABSTRACT

A bicycle component actuating device is provided with a base member, a first user operating member, a locking member and a second user operating member. The first user operating member rotates between first and second operating positions about a rotational axis in a first operating plane that intersects with the rotational axis. The locking member is moves between a locking position to lock the first user operating member in the second operating position and a releasing position to release the first operating member from the second operating position. The second user operating member moves from a non-releasing position to a releasing position for releasing the first user operating member. One of the locking member and the second user operating member is movably along an operating path that intersects with the first operating plane of the first user operating member.

21 Claims, 16 Drawing Sheets

BICYCLE COMPONENT ACTUATING DEVICE

BACKGROUND OF THE INVENTION

1. Field of the Invention

This invention generally relates to a bicycle component actuating device for operating a bicycle component. More specifically, the present invention relates to a bicycle component actuating device that has a pair of operating members that are conveniently located for a user.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames which typically transmitted the shocks resulting from rough riding surfaces directly to the rider. In other words, most bicycles were not provided with any front or rear suspension. Recently, bicycles, especially mountain bikes (MTB) and all terrain bikes (ATB), have been outfitted with front and/or rear suspension assemblies to absorb the shocks transmitted to the rider when riding on a rough road.

In these bicycles with suspensions, it is sometimes desirable to be able to quickly adjust or lockout the suspension as needed and/or desired. Thus, there have been proposals to provide a suspension actuating device on the handlebar of the bicycle so that the rider can adjust or lockout the suspension as needed and or desired while riding. Three examples of actuating devices for bicycle suspensions are disclosed in U.S. Pat. No. 6,767,024, U.S. Patent Publication No. 2005/0103149 and U.S. Patent Publication No. 2005/0252330. While these actuating devices are functional, it is desirable to provide an actuating device that is simple to operate with distinct operating motions for switching between a first operating position (e.g., a first suspension setting position) and a second operating position (e.g., a second suspension setting position).

In view of the above, it will be apparent to those skilled in the art from this disclosure that there exists a need for an improved bicycle component actuating device. This invention addresses this need in the art as well as other needs, which will become apparent to those skilled in the art from this disclosure.

SUMMARY OF THE INVENTION

One object of the present invention is to provide a bicycle component actuating device that has distinct operating motions for switching between a first operating position and a second operating position.

Another object of the present invention is to provide a bicycle component actuating device that is conveniently located for a user to switch between a first operating position and a second operating position while riding.

The foregoing objects can basically be attained by providing a bicycle component actuating device that includes a base member, a first user operating member, a locking member and a second user operating member. The first user operating member is movably mounted relative to the base member for rotation between a first operating position and a second operating position about a rotational axis in a first operating plane that intersects with the rotational axis. The locking member is movably mounted relative to the base member for selective movement between a locking position to lock the first user operating member in the second operating position and a releasing position to release the first operating member from the second operating position. The second user operating member is movably mounted relative to the base member for selective movement between a non-releasing position and a releasing position for selectively operating the locking member to release the first user operating member when moved from the non-releasing position to the releasing position. One of the locking member and the second user operating member is movably along an operating path that intersects with the first operating plane of the first user operating member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
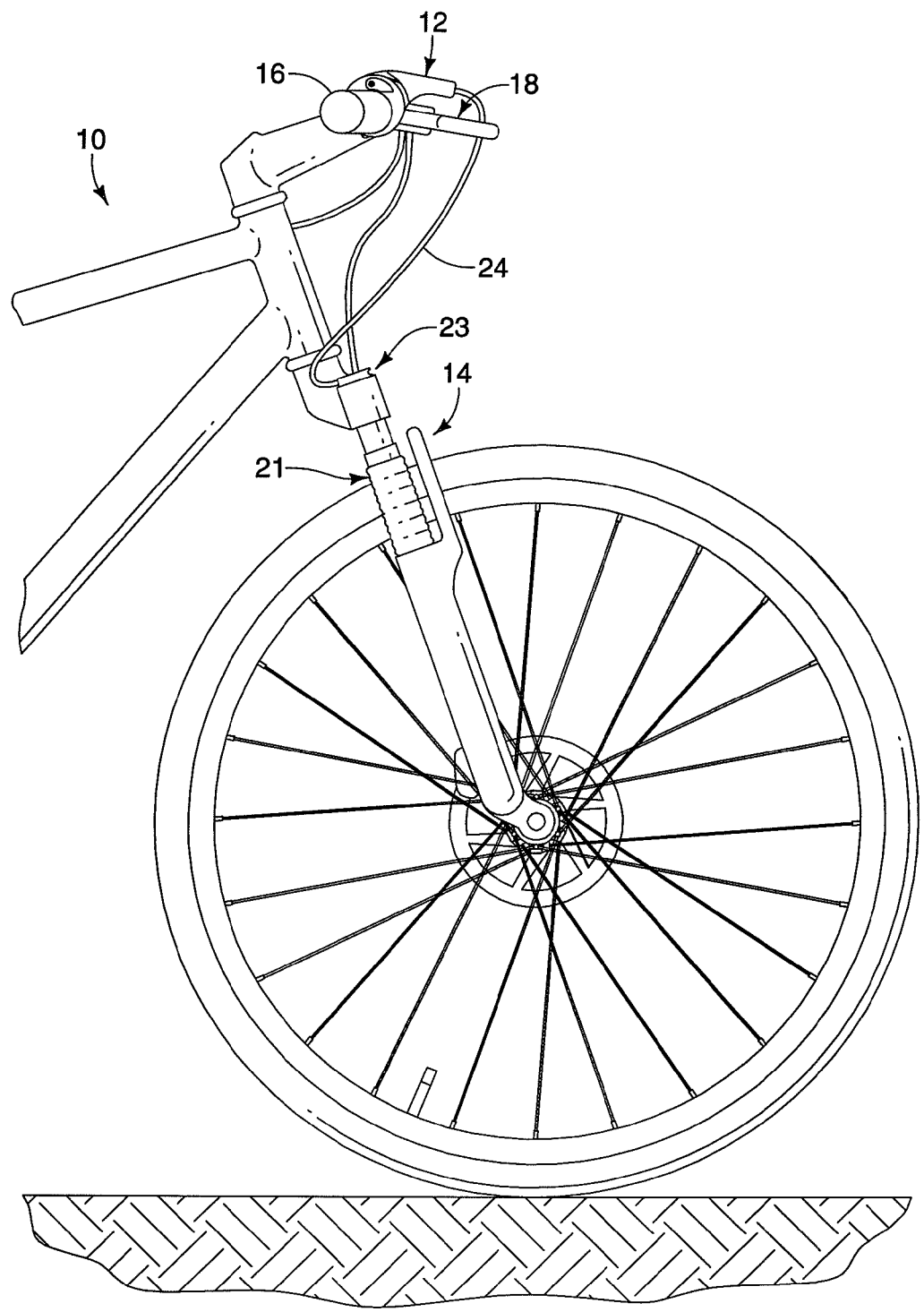
FIG. 1 is a partial side elevational view of a front portion of a bicycle with a bicycle component actuating device in accordance with one embodiment of the present invention.
Figure 2:
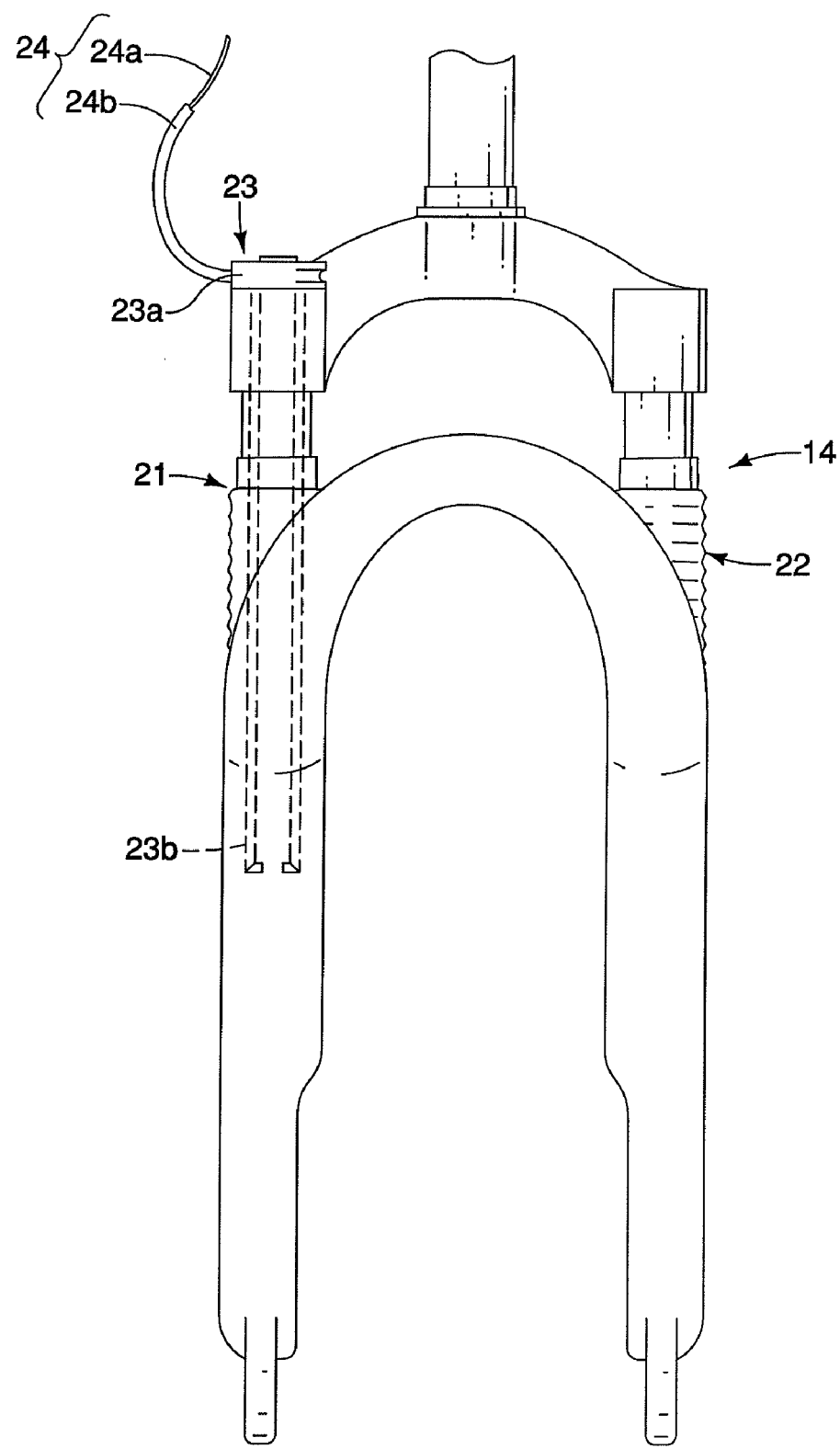
FIG. 2 is a front elevational view of a front suspension that is operated by the bicycle component actuating device in accordance with one embodiment of the present invention.
Figure 3:
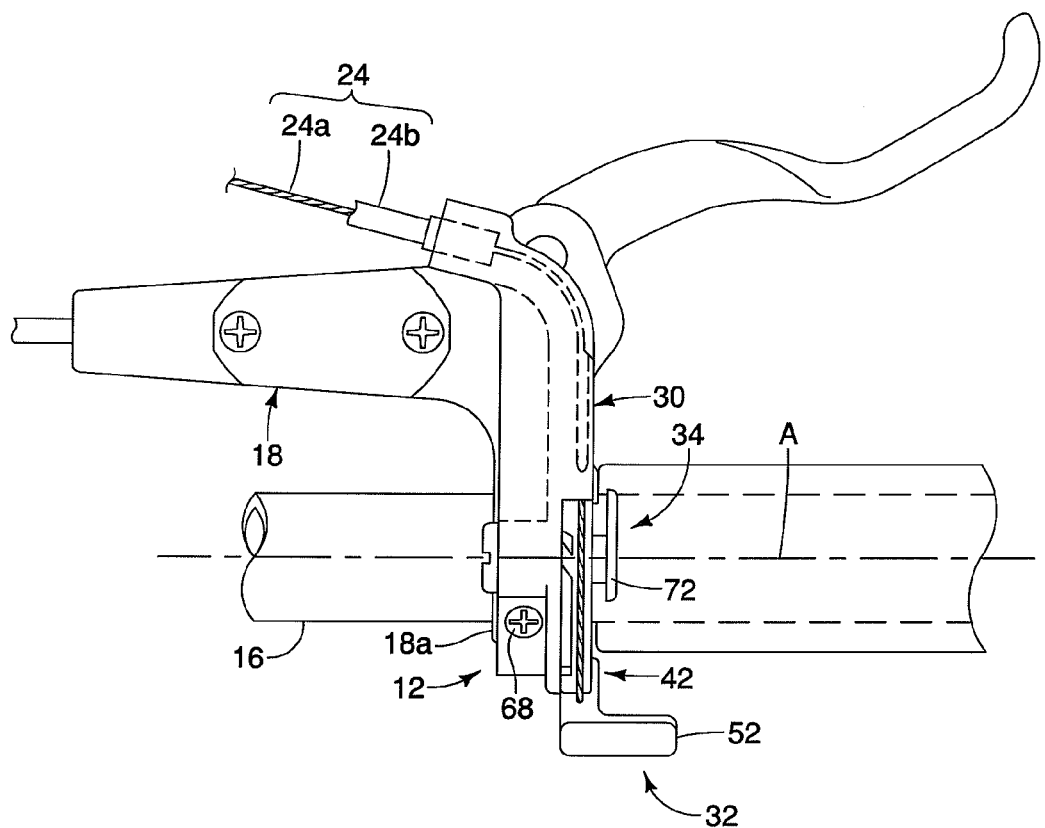
FIG. 3 is a top plan view of the bicycle component actuating device mounted to a hydraulic brake lever in accordance with the present invention.
Figure 4:
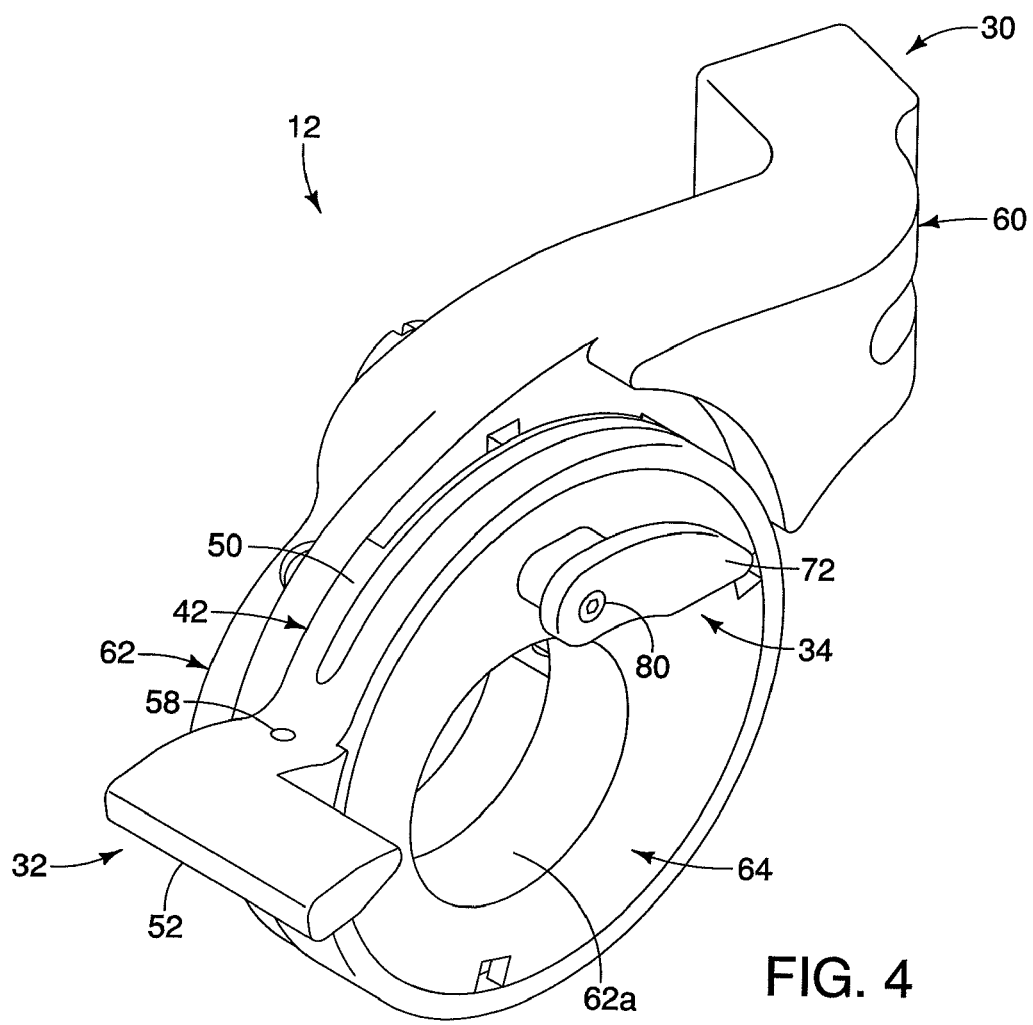
FIG. 4 is a side perspective view of the bicycle component actuating device with a mounting clamp in accordance with the present invention.

Referring initially to FIGS. 1 to 3, a bicycle 10 is illustrated that is equipped with a bicycle component actuating device 12 for selectively controlling a front suspension 14 in accordance with a first embodiment of the present invention. In particular, the bicycle component actuating device 12 is operatively coupled to the front suspension 14 to selectively switch between a first operating position (e.g., a first suspension setting position) and a second operating position (e.g., a second suspension setting position). In the illustrated embodiment, the first operating position corresponds to one of a suspension operating position, a low damping characteristic position, a low spring-rate position and a short stroke position, while the second operating position corresponds to one of a suspension lockout position, a high damping characteristic position, a high spring-rate position and a long stroke position.

As seen in FIGS. 1 and 3, the bicycle component actuating device 12 is mounted to a handlebar 16 via a tube clamp 18a of a brake lever 18. However, alternatively, the bicycle component actuating device 12 is mounted to the handlebar 16 via a separate tube clamp 20 as seen in FIGS. 4 to 9. Since the tube clamp 18a of the brake lever 18 is similar to the tube clamp 20, except for the tube clamp 18a being integrated into the brake lever 18, only the tube clamp 20 will be discussed and illustrated in detail herein.

As seen in FIG. 2, the front suspension 14 has a pair of telescopic tubes 21 and 22 for absorbing shocks while riding the bicycle 10 over rough terrain. The telescopic tube 21 is provided with a suspension setting mechanism 23 for selectively setting the front suspension 14 to control expansion and contraction of the telescopic tubes 21 and 22. The suspension setting mechanism 23 is provided with a cable operated adjustment knob 23a and an actuated member 23b. Cable operated suspension setting mechanism are known in the bicycle field, and thus, the precise structure of the suspension setting mechanism 23 will not be discussed or illustrated in detail herein. Preferably, the suspension setting mechanism 23 is one of the following: a suspension lockout mechanism, a suspension damping mechanism, a suspension spring adjustment mechanism, or a suspension stroke adjustment mechanism. In the case of the suspension setting mechanism 23 being a suspension lockout mechanism, the first and second operating positions correspond to a suspension operating position and a suspension lockout mechanism in which the expansion and contraction of the telescopic tubes 21 and 22 is selectively locked and unlocked. In the case of the suspension setting mechanism 23 being a suspension damping mechanism, the first and second operating positions correspond to suspension setting conditions in which the damping characteristics are adjusted between first and second damping characteristics such as a low damping characteristic and a high damping characteristic. In the case of the suspension setting mechanism 23 being a suspension spring adjustment mechanism the first and second operating positions correspond to suspension setting conditions in which the spring characteristics are adjusted between first and second spring-rate characteristics such as a low spring-rate characteristics and a high spring-rate characteristic. In the case of the suspension setting mechanism 23 being a suspension stroke adjustment mechanism, the first and second operating positions correspond to suspension setting conditions in which the stroke characteristics are adjusted between first and second characteristics such as a short stroke characteristics and a long stroke characteristic. Moreover, it will be apparent to those skilled in the art from this disclosure that the bicycle component actuating device 12 can be used with a rear suspension. In other words, a pair of the bicycle component actuating devices 12 can be provided on a single bicycle with one controlling a front suspension and the other controlling the rear suspension as needed and/or desired.

In the illustrated embodiment, the bicycle component actuating device 12 is configured and arranged to operate to the adjustment knob 23a for selectively locking and unlocking the front suspension 14. Thus, the bicycle component actuating device 12 is preferably connected to the adjustment knob 23a by a control cable 24 that has an inner wire 24a and an outer casing 24b. The inner wire 24a is pulled by the bicycle component actuating device 12 to switch the front suspension 14 from the first operating position (e.g., an unlocked position, a low damping characteristic position, a low spring-rate position or a short stroke position) to the second operating position (e.g., a locked position, a high damping characteristic position, a high spring-rate position and a long stroke position). The inner wire 24a is released by the bicycle component actuating device 12 to switch the front suspension 14 from the second operating position (e.g., a locked position, a high damping characteristic position, a high spring-rate position and a long stroke position) to the first operating position (e.g., an unlocked position, a low damping characteristic position, a low spring-rate position or a short stroke position).

Referring now to FIGS. 2, 4 to 9, the bicycle component actuating device 12 will be discussed in more detail. The bicycle component actuating device 12 basically includes a base member 30, a wire winding mechanism 32 and a release mechanism 34. The bicycle component actuating device 12 is used to selectively switch the front suspension 14 between the first operating position (e.g., an unlocked position, a low damping characteristic position, a low spring-rate position or a short stroke position) and the second operating position (e.g., a locked position, a high damping characteristic position, a high spring-rate position and a long stroke position) by selectively pulling and releasing the inner wire 24a. When the bicycle component actuating device 12 is operated to pull the inner wire 24a, the adjustment knob 23a is turned to lockout the front suspension 14 so as to prevent expansion and contraction of the telescopic tubes 21 and 22. When the bicycle component actuating device 12 is operated to release the inner wire 24a, the adjustment knob 23a is turned in the opposite direction for unlocking the front suspension 14 to allow expansion and contraction of the telescopic tubes 21 and 22.

Figure 13:
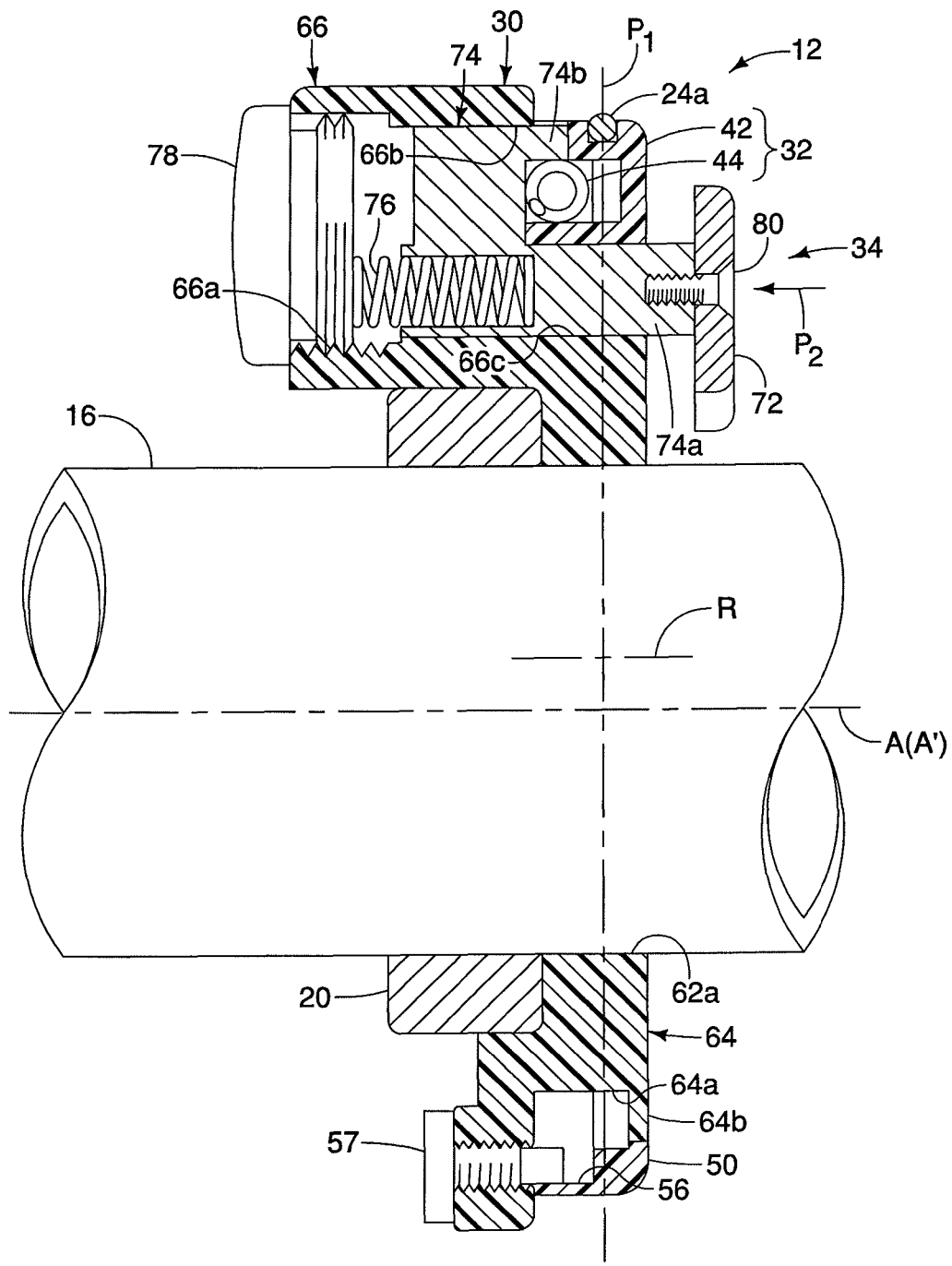
FIG. 13 is a cross sectional view of the bicycle component actuating device as seen along section line 13-13 of FIG. 7, with the first user operating member in a pre-assembled state.

As seen in FIGS. 3 and 13, the base member 30 is a stationary member that is fixedly mounted to an end portion of the handlebar 16 via the tube clamp 18a of the brake lever 18 (FIG. 3) or via the tube clamp 20 (FIG. 13). In either case, the base member 30 is positioned so that the rider can easily operate the wire winding mechanism 32 and the release mechanism 34 without the rider's hand leaving the handlebar 16. Generally speaking, the wire winding mechanism 32 has an operating path that curves about a center mounting axis A of the handlebar 16, while the release mechanism 34 has an operating path of that extends linearly (e.g., parallel) with respect to the mounting axis A, as explained below.

As seen in FIGS. 5, 6, 9 and 13, the wire winding mechanism 32 basically includes a first user operating member 42 and a biasing element 44. The first user operating member 42 is movably mounted relative to the base member 30 for rotation between the first operating position (FIG. 11) and the second operating position (FIG. 12) about a rotational axis R in a first operating plane $P_1$ that intersects with (e.g., in this embodiment, is substantially perpendicular) to the rotational axis R. One end of the biasing element 44 is attached the base member 30 by a bolt 46, while the other end of the biasing element 44 is attached to the first user operating member 42 by a pin 48. The first user operating member 42 is biased relative to the base member 30 to the first operating position by the biasing element 44. In the illustrated embodiment, the first operating position (FIG. 11) corresponds to a suspension unlocked position, a low spring-rate position or a short stroke position, while the second operating position (FIG. 12) corresponds to a suspension lockout position. Because the biasing element 44 is built-into the winding mechanism 32 to return the first user operating member 42 to the first operating position, there is no need for a strong return-spring in the suspension setting mechanism 23 to aid in returning the first user operating member 42 to the first operating position. Rather, the suspension setting mechanism 23 can be designed with a relatively weak return spring such that only a small pulling force occurs in the inner wire 24a to aid in returning the first user operating member 42 to the first operating position. In other words, the spring 44 preferably cooperate with another return spring mounted into e.g. the suspension setting mechanism 23 to return the winding mechanism 32 to the first operating position such that it is possible to use a relatively weak spring in the suspension setting mechanism 23.

As seen in FIGS. 5, 6, 9 and 27 to 30, the first user operating member 42 includes a ring shaped portion 50 and a user engagement or handle portion 52 extending from the ring shaped portion 50. In the illustrated embodiment, the first user operating member 42 is constructed as a one-piece, unitary member from a hard, rigid material such as a lightweight metal. Basically, the first user operating member 42 moves along a curved path that that at least partially encircles the center mounting axis A.

Figure 11:
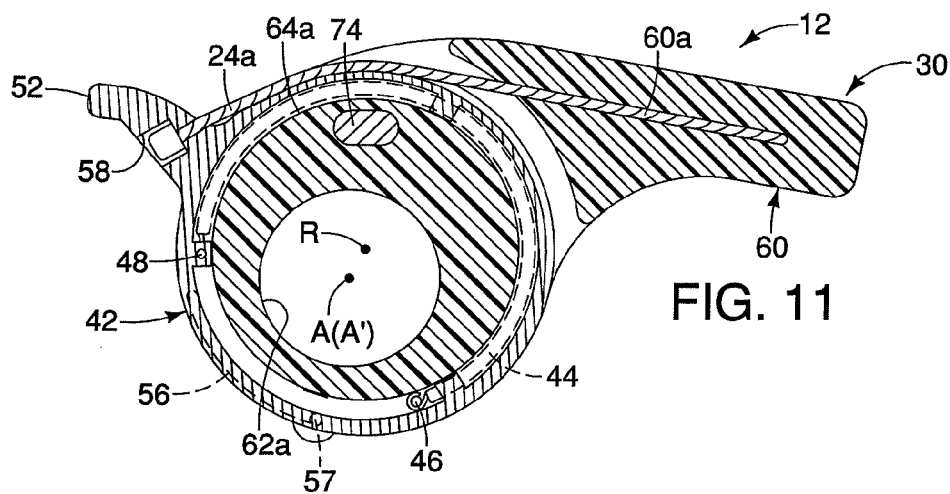
FIG. 11 is a cross sectional view, similar to FIG. 10, of the bicycle component actuating device, but with the first user operating member in a first operating position state in which the front suspension is in one of an unlocked position, a low damping characteristic position, a low spring-rate position and a short stroke position to control expansion and contraction of the front suspension.

The ring shaped portion 50 of the first user operating member 42 is provided with three mounting tabs 50a that retain the first user operating member 42 on the base member 30 in a rotatable manner. One of the mounting tabs 50a includes a hole for receiving the pin 48 therethrough such that the biasing element 44 is attached to the first user operating member 42. In the illustrated embodiment, the biasing element 44 is a coiled tension spring that is preload when in the first operating position as seen in FIG. 11. As mentioned above, the first user operating member 42 is biased relative to the base member 30 to the first operating position by the biasing element 44.

Figure 12:
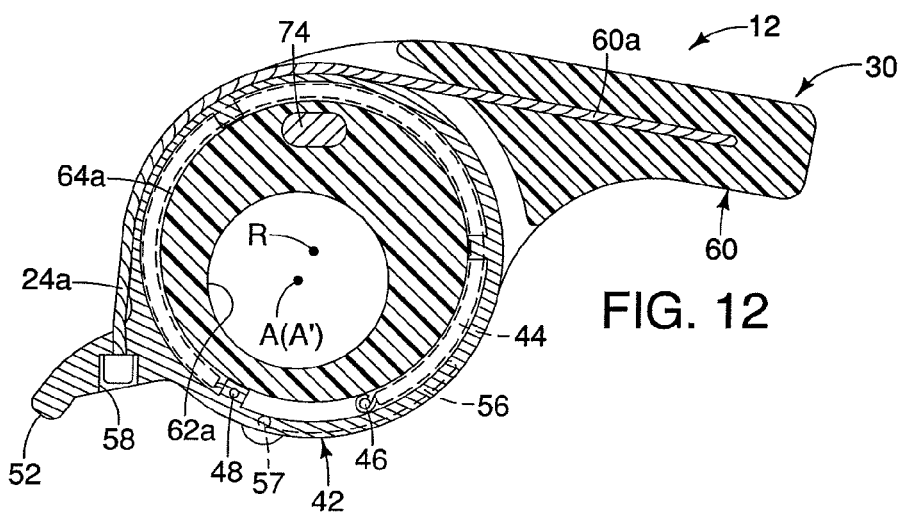
FIG. 12 is a cross sectional, similar to FIGS. 10 and 11, of the bicycle component actuating device, but with the first user operating member in a second operating position state in which the front suspension is in one of a locked position, a high damping characteristic position, a high spring-rate position and a long stroke position to control expansion and contraction of the front suspension.
Figure 17:
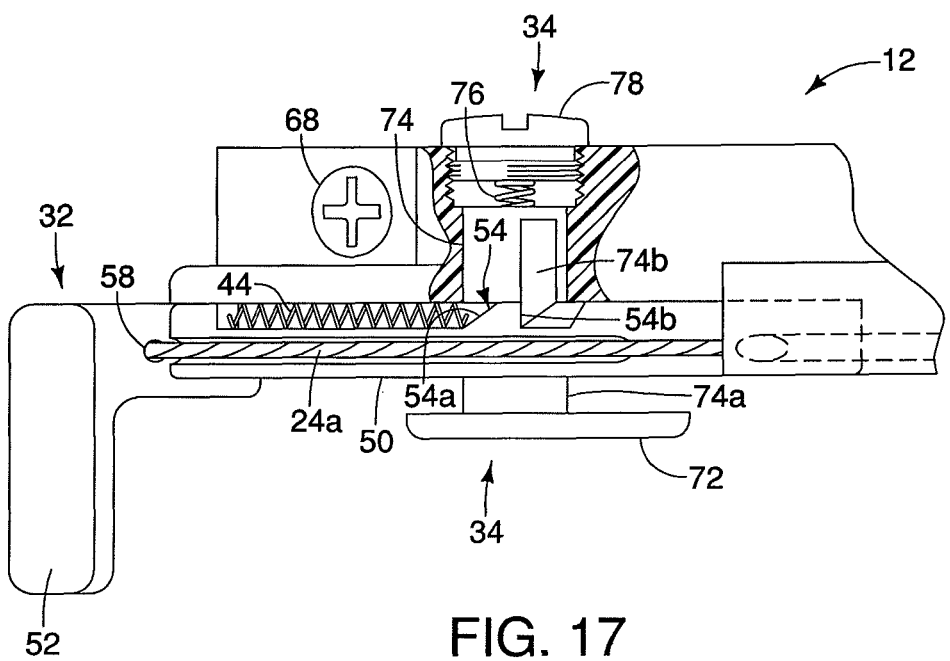
FIG. 17 is a top plan view, similar to FIGS. 14 to 16, of the bicycle component actuating device with a portion broken away to reveal the release mechanism in a state corresponding to one of a locked position, a high damping characteristic position, a high spring-rate position and a long stroke position to control expansion and contraction of the front suspension.
Figure 18:
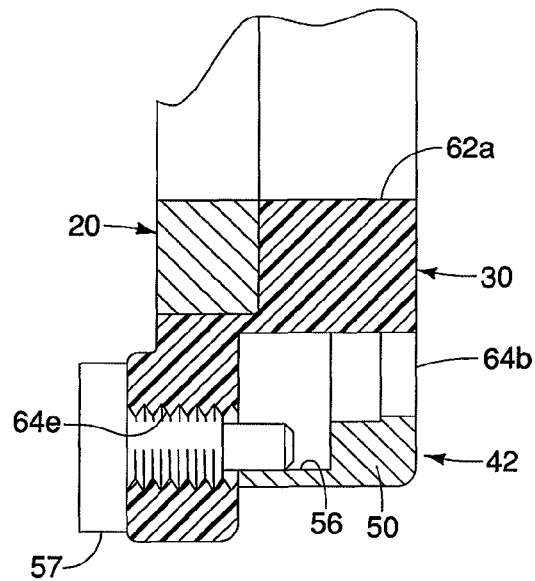
FIG. 18 is a partial cross sectional view of the bicycle component actuating device as seen along section line 18-18 of FIG. 8, which illustrates the rotation limiting arrangement between the base member and the wire winding mechanism.
Figure 19:
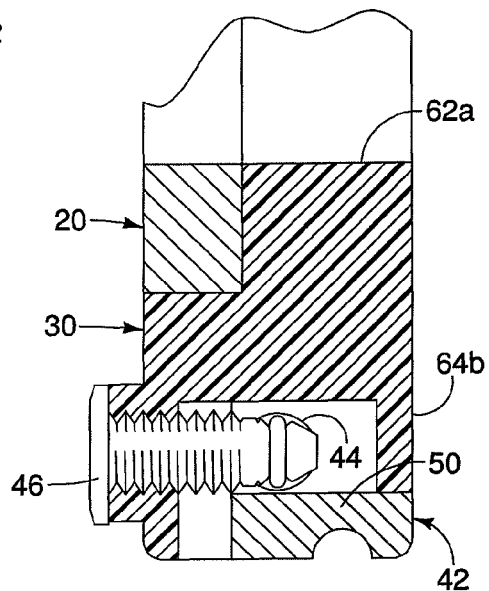
FIG. 19 is a partial cross sectional view of the bicycle component actuating device as seen along section line 19-19 of FIG. 8, which illustrates the connection between the base member and the return spring of the wire winding mechanism.
Figure 20:
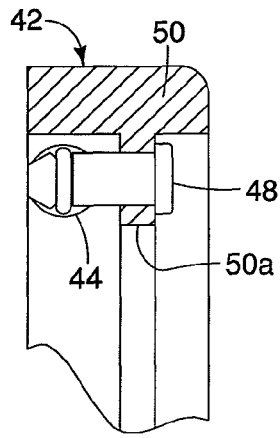
FIG. 20 is a partial cross sectional view of the bicycle component actuating device as seen along section line 20-20 of FIG. 7, which illustrates the connection between the first user operating member and the return spring of the wire winding mechanism.
Figure 21:
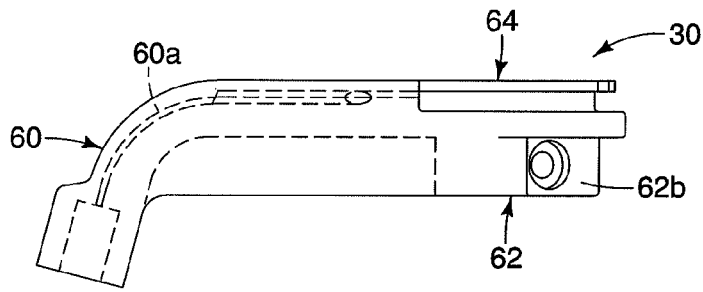
FIG. 21 is a top plan view of the base member for the bicycle component actuating device of the present invention.

The ring shaped portion 50 of the first user operating member 42 also has a cutout with a projection 54. The projection 54 is provided with a cam surface 54a and an abutment or stop surface 54b. The cam surface 54a is angled with respect to the rotational axis R, while the stop surface 54b is parallel to the rotational axis R. As explained below, the cam surface 54a of the projection 54 cooperates with the release mechanism 34 such that the first user operating member 42 can be moved in a single continuous progressive movement from the first (unlocked, low damping characteristic, low spring-rate or short stroke) operating position (FIG. 11) to the second (locked, high damping characteristic, high spring-rate or a long stroke) operating position (FIG. 12). Also as explained below, the stop surface 54b of the projection 54 cooperates with the release mechanism 34 to hold the first user operating member 42 in the second operating position (FIGS. 12 and 17) where the front suspension 14 set to one of the locked position, the high damping characteristic position, the high spring-rate position and the long stroke position for controlling expansion and contraction of the telescopic tubes 21 and 22. By adding additional projections such as the projection 54, it is possible to further increasing the number of operation positions, e.g., to have a third operating position and a fourth operating position besides the above-mentioned first and second operating positions, as needed and/or desired.

As seen in FIGS. 10 to 13, the ring shaped portion 50 of the first user operating member 42 also has an arc shaped groove 56 that is used to limit rotational movement of the first user operating member 42 with respect to the base member 30. In particular, a bolt 57 is fixed to the base member 30 with the tip of the bolt 57 being located in the groove 56. Prior to installation of the bolt 57, the biasing element 44 biases the first user operating member 42 to the position shown in FIGS. 10 and 14. Then the first user operating member 42 is rotated to stretch the biasing element 44 so that the bolt 57 can be installed into the groove 56. When the first user operating member 42 is in the first (unlocked, low damping characteristic, low spring-rate or short stroke) operating position (FIG. 11), the bolt 57 abuts against an end surface at one end of the groove 56. When the first user operating member 42 is moved from the first (unlocked, low damping characteristic, low spring-rate or short stroke) operating position (FIG. 11) to the second (locked, high damping characteristic, high spring-rate or a long stroke) operating position (FIG. 12), the bolt 57 abuts against an end surface at the other end of the groove 56 to limit rotational movement.

The handle portion 52 of the first user operating member 42 includes a wire attachment structure 58 for attaching the inner wire 24a thereto. Thus, as the first user operating member 42 is rotated, the inner wire 24a is pulled in one rotational direction and releases in the other rotational direction. The wire attachment structure 58 is arranged such that the inner wire 24a engages a peripheral surface of the ring shaped portion 50 of the first user operating member 42 when the first user operating member 42 is from the first operating position to the second operating position.

As seen in FIGS. 21 to 26, the base member 30 basically includes an inner wire guide structure 60, a tube mounting structure 62, a winding mechanism supporting structure 64 and a release mechanism supporting structure 66. In the illustrated embodiment, the base member 30 is constructed as a one-piece, unitary member from a hard, rigid material such as a hard plastic or a lightweight metal.

The inner wire guide structure 60 is configured and arranged for guiding the inner wire 24a to the wire winding mechanism 32. In particular, the inner wire guide structure 60 has a wire passage 60a that is arranged relative to the wire attachment structure 58 of the ring shaped portion 50 of the first user operating member 42 such that the inner wire 24a winds about the peripheral surface of the ring shaped portion 50 of the first user operating member 42 when the first user operating member 42 is moved from the first operating position to the second operating position.

The tube mounting structure 62 having a tube receiving bore 62a and a clamp mounting flange 62b. The tube receiving bore 62a has a diameter that is slightly larger than the diameter of the handlebar 16 for receiving the end portion of the handlebar 16 therein. When the bicycle component actuating device 12 is mounted to the end portion of the handlebar 16, the tube receiving bore 62a has its center mounting axis A' generally coincident with the center mounting axis A of the end portion of the handlebar 16. In particular, the clamp mounting flange 62b of the tube mounting structure 42 is a curved member in which the tube clamp 18a or 20 is fixed thereto by a pair of threaded fasteners or screws 68. Thus, the bicycle component actuating device 12 is mounted to the end portion of the handlebar 16 by the tube clamp 18a or 20, which is fixed to the tube mounting structure 62. As seen in FIG. 13, the center mounting axis A' of the tube mounting structure 62 is offset from the rotational axis R of the first user operating member 42, but parallel to the rotational axis R of the first user operating member 42.

As seen in FIGS. 23 to 26, the winding mechanism supporting structure 64 is a partial spool shaped member that includes a cylindrical support surface 64a and an annular mounting flange 64b. The annular mounting flange 64b has three cutouts 64c for installing the ring shaped portion 50 of the first user operating member 42 around the cylindrical support surface 64a such that the first user operating member 42 rotate on the base member 30. In particular, the three cutouts 64c are arranged such that the three mounting tabs 50a of the first user operating member 42 can be inserted through the three cutouts 64c when the first user operating member 42 is in a first angular orientation and then the annular mounting flange 64b retains the first user operating member 42 on the base member 30 when the first user operating member 42 is in a second angular orientation. In other words, a bayonet type mounting arrangement is formed between the first user operating member 42 and the base member 30. Preferably, the three mounting tabs 50a and the three cutouts 64c are arranged so that they will not be aligned at any point when the first user operating member 42 is moved between the first and second operating positions.

Figure 22:
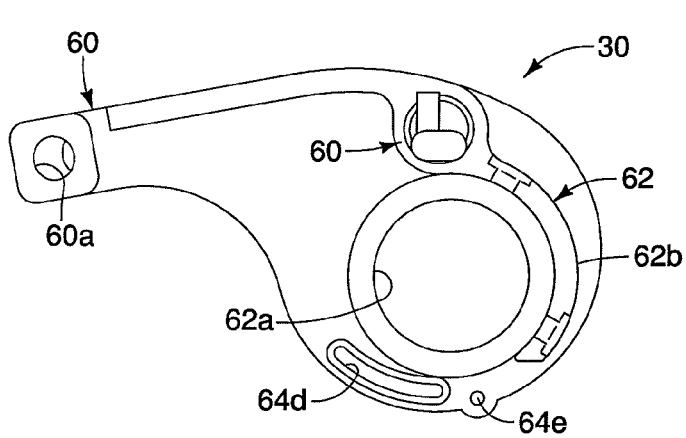
FIG. 22 is an inner side elevational view of the base member for the bicycle component actuating device illustrated in FIG. 21.
Figure 24:
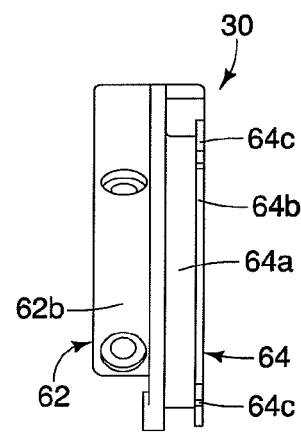
FIG. 24 is a rear side elevational view of the base member for the bicycle component actuating device illustrated in FIGS. 21 to 23.
Figure 23:
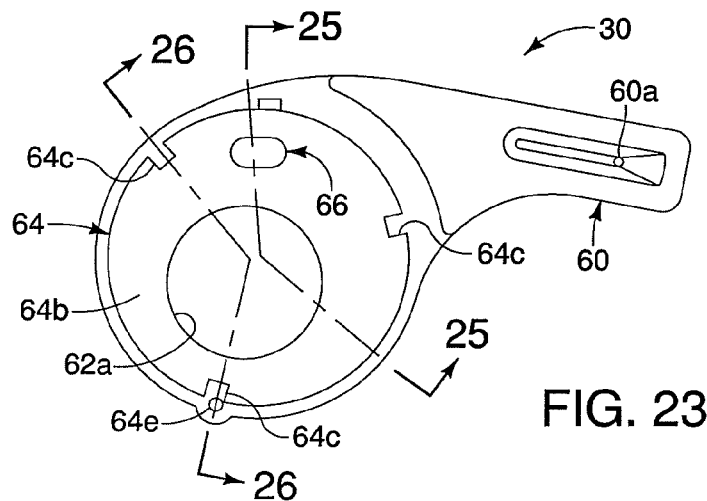
FIG. 23 is an outer side elevational view of the base member for the bicycle component actuating device illustrated in FIGS. 21 and 22.
Figure 25:
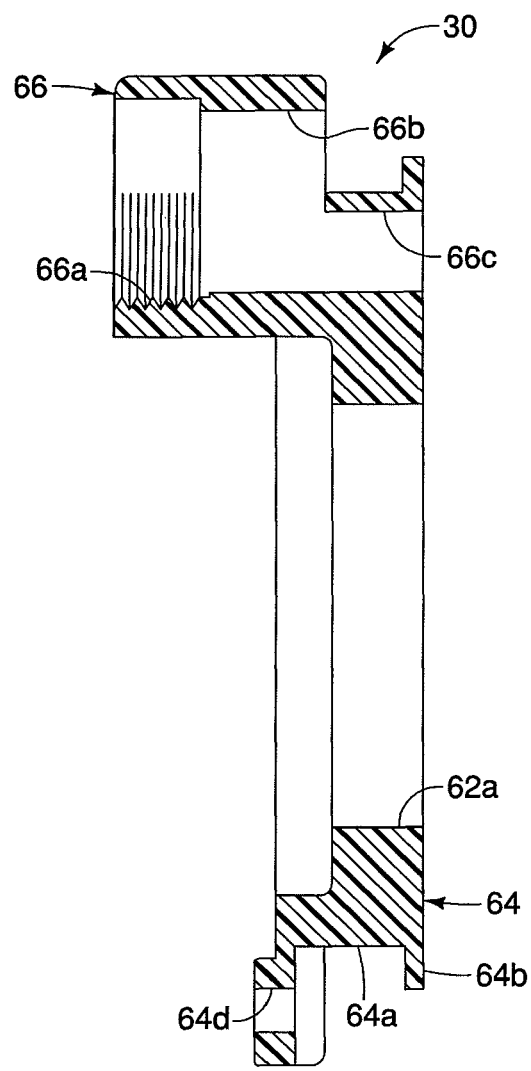
FIG. 25 is a cross sectional view of the base member for the bicycle component actuating device as seen along section line 25-25 of FIG. 23.
Figure 26:
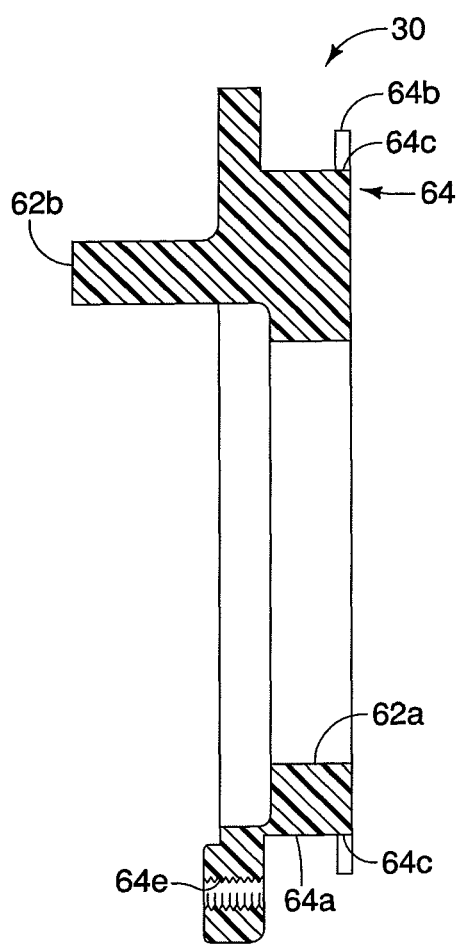
FIG. 26 is a cross sectional view of the base member for the bicycle component actuating device as seen along section line 26-26 of FIG. 23.
Figure 27:
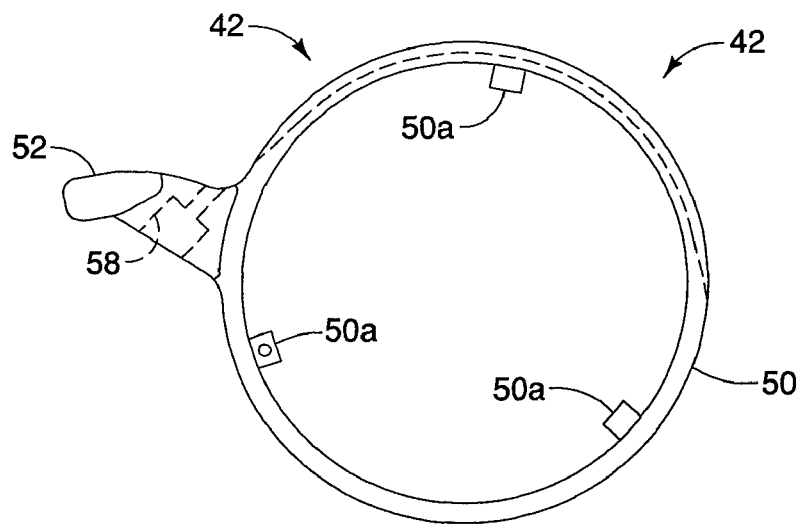
FIG. 27 is an outer side elevational view of the first user operating member for the bicycle component actuating device of the present invention.
Figure 28:
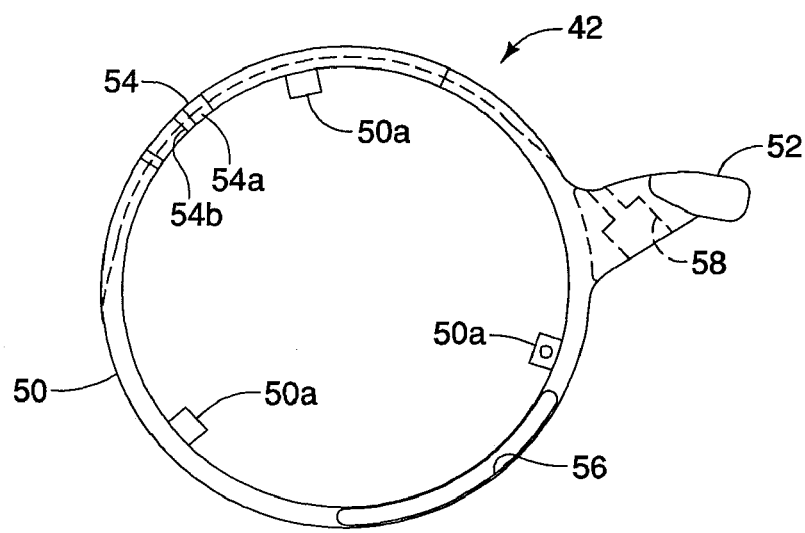
FIG. 28 is an inner side elevational view of the first user operating member for the bicycle component actuating device illustrated in FIG. 27.
Figure 29:
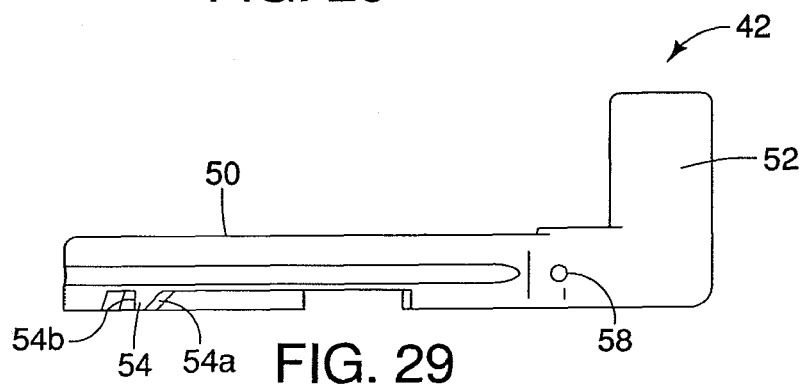
FIG. 29 is a top plan view of the first user operating member for the bicycle component actuating device illustrated in FIGS. 27 and 28.
Figure 30:
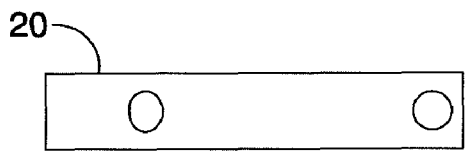
FIG. 30 is a top plan view of the tube clamp for the bicycle component actuating device of the present invention.
Figure 31:
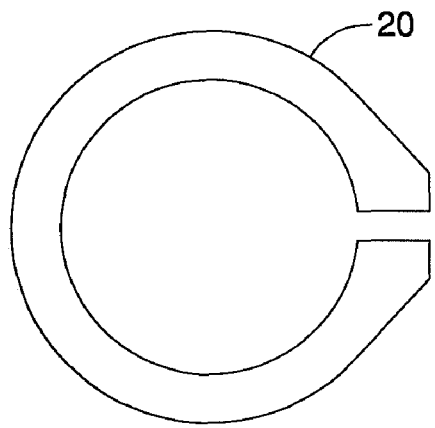
FIG. 31 is an outer side elevational view of the tube clamp for the bicycle component actuating device illustrated in FIG. 30.
Figure 32:
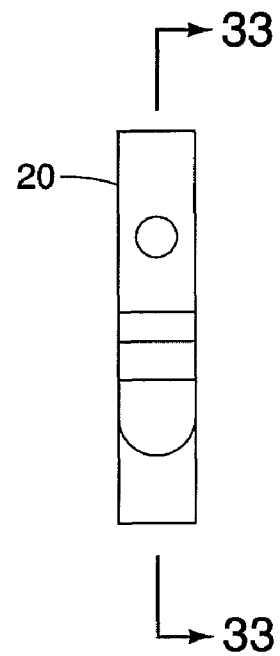
FIG. 32 is a front side elevational view of the tube clamp for the bicycle component actuating device illustrated in FIGS. 30 and 31.
Figure 33:
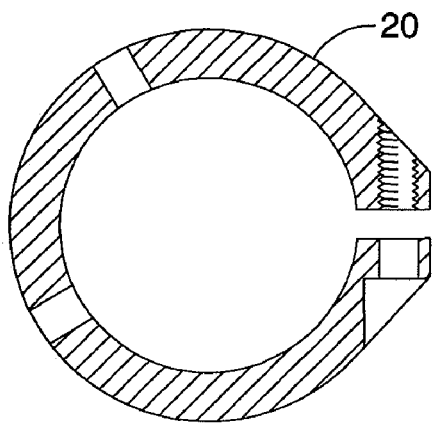
FIG. 33 is a front side elevational view of the tube clamp for the bicycle component actuating device illustrated in FIGS. 30 to 32.

As seen in FIGS. 22, 25 and 26, the winding mechanism supporting structure 64 further includes an arc shaped slot 64d and a threaded hole 64e. The arc shaped slot 64d threadedly receives the bolt 46, while the threaded hole 64e threadedly receives the bolt 57. The bolt 46 is attached to one end of the biasing element 44 to fix the one end of the biasing element 44 to the base member 30. Preferably, the bolt 46 is a self tapping bolt that cuts threads into the slot 64d of the base member 30. The slot 64d of the base member 30 allows the installer to adjust the tension in the biasing element 44, as needed and/or desired, for applying the needed and/or desired pulling force to the first user operating member 42. The free end or tip of the bolt 57 is disposed in the groove 56 to limit rotational movement of the first user operating member 42 with respect to the base member 30. When the first user operating member 42 is in the first (unlocked, low damping characteristic, low spring-rate or short stroke) operating position (FIG. 11), the bolt 57 abuts against an end surface at one end of the groove 56. When the first user operating member 42 is moved from the first (unlocked, low damping characteristic, low spring-rate or short stroke) operating position (FIG. 11) to the second (locked, high damping characteristic, high spring-rate or a long stroke) operating position (FIG. 12), the bolt 57 abuts against an end surface at the other end of the groove 56 to limit rotational movement.

As seen in FIGS. 13, 22, 25 and 26, the release mechanism supporting structure 66 of the base member 30 is basically a bore having a main opening 66a at a first end, a locking opening 66b at an intermediate location and an operating opening 66c at the other end. Basically, parts of the release mechanism 34 are inserted into the main opening 66a as explained below.

Figure 5:
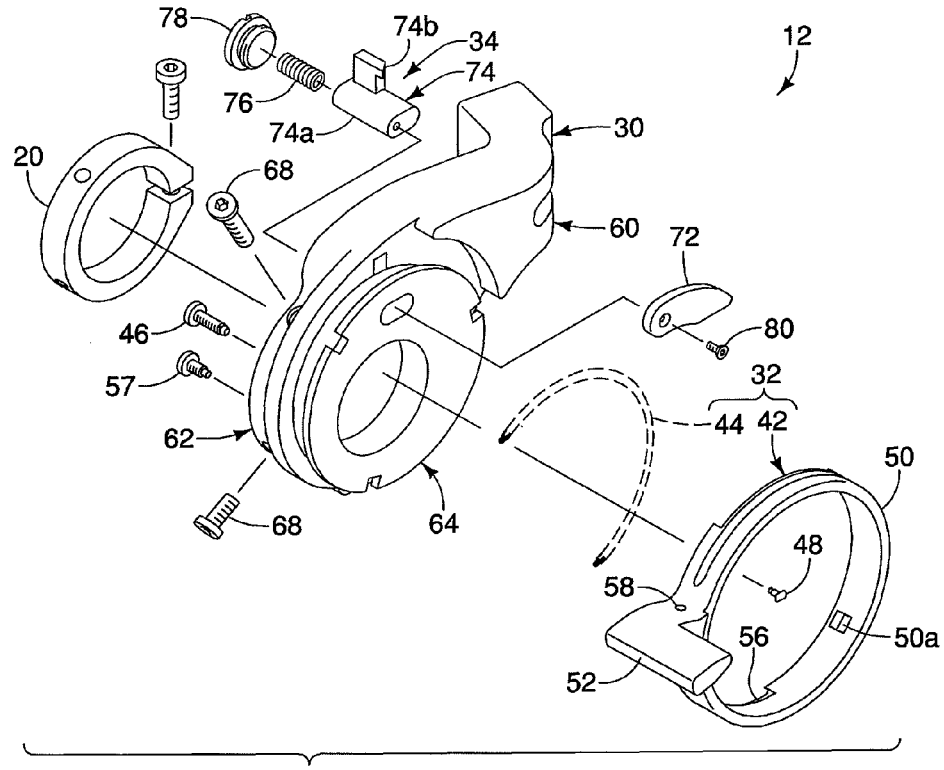
FIG. 5 is an exploded outer side perspective view of the bicycle component actuating device illustrated in FIG. 4.
Figure 6:
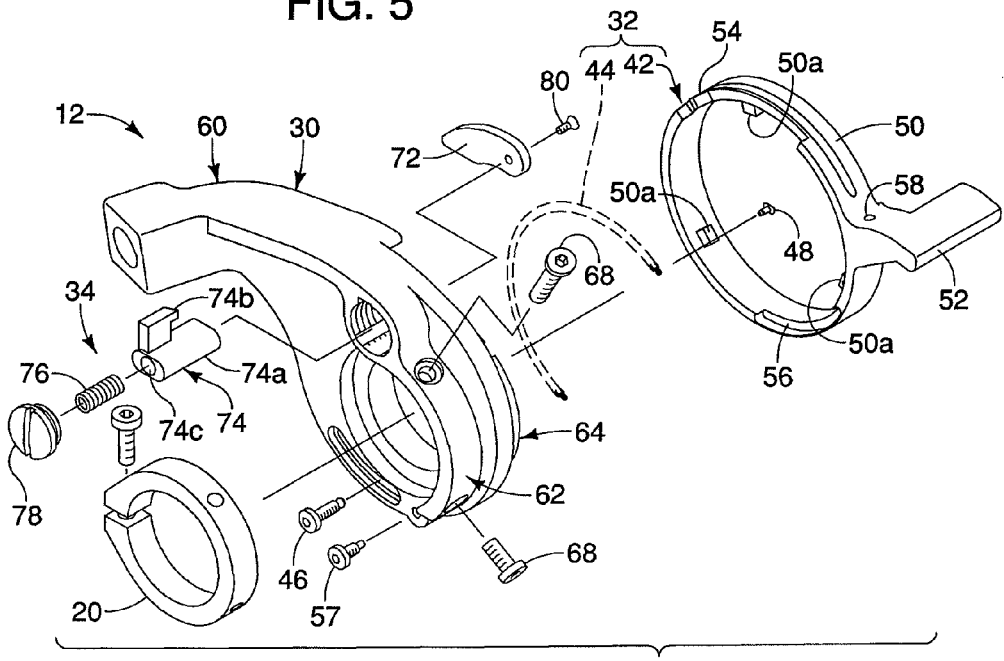
FIG. 6 is an exploded inner side perspective view of the bicycle component actuating device illustrated in FIGS. 4 and 5.
Figure 7:
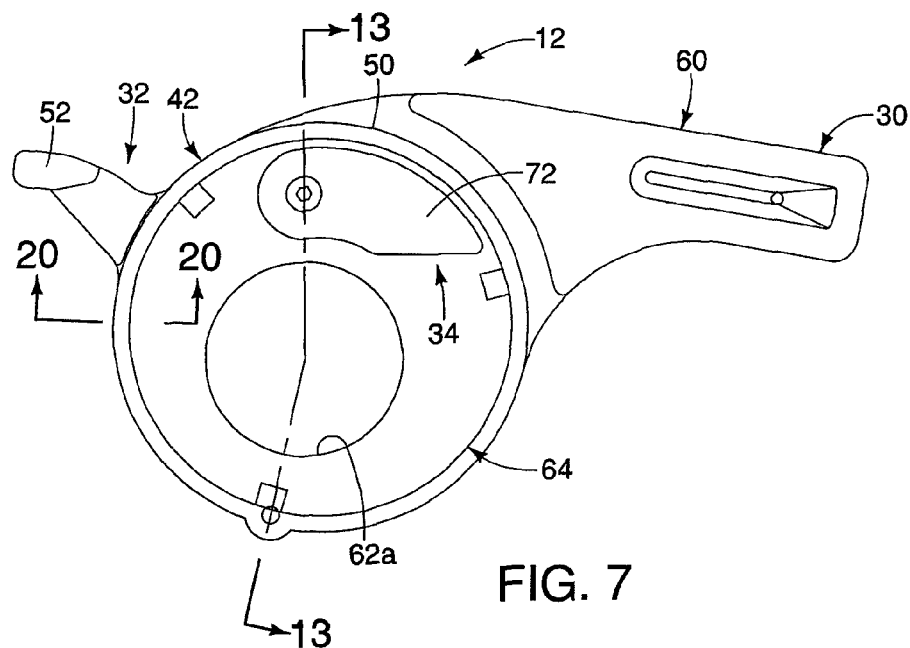
FIG. 7 is an outer side elevational view of the bicycle component actuating device illustrated in FIGS. 4 to 6.
Figure 8:
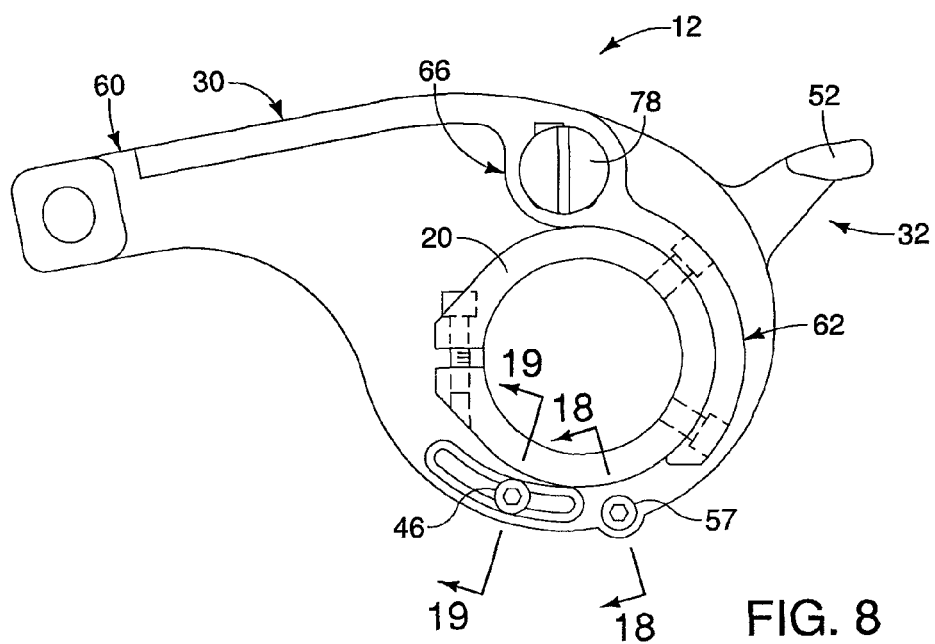
FIG. 8 is an inner side elevational view of the bicycle component actuating device illustrated in FIGS. 4 to 7.
Figure 9:
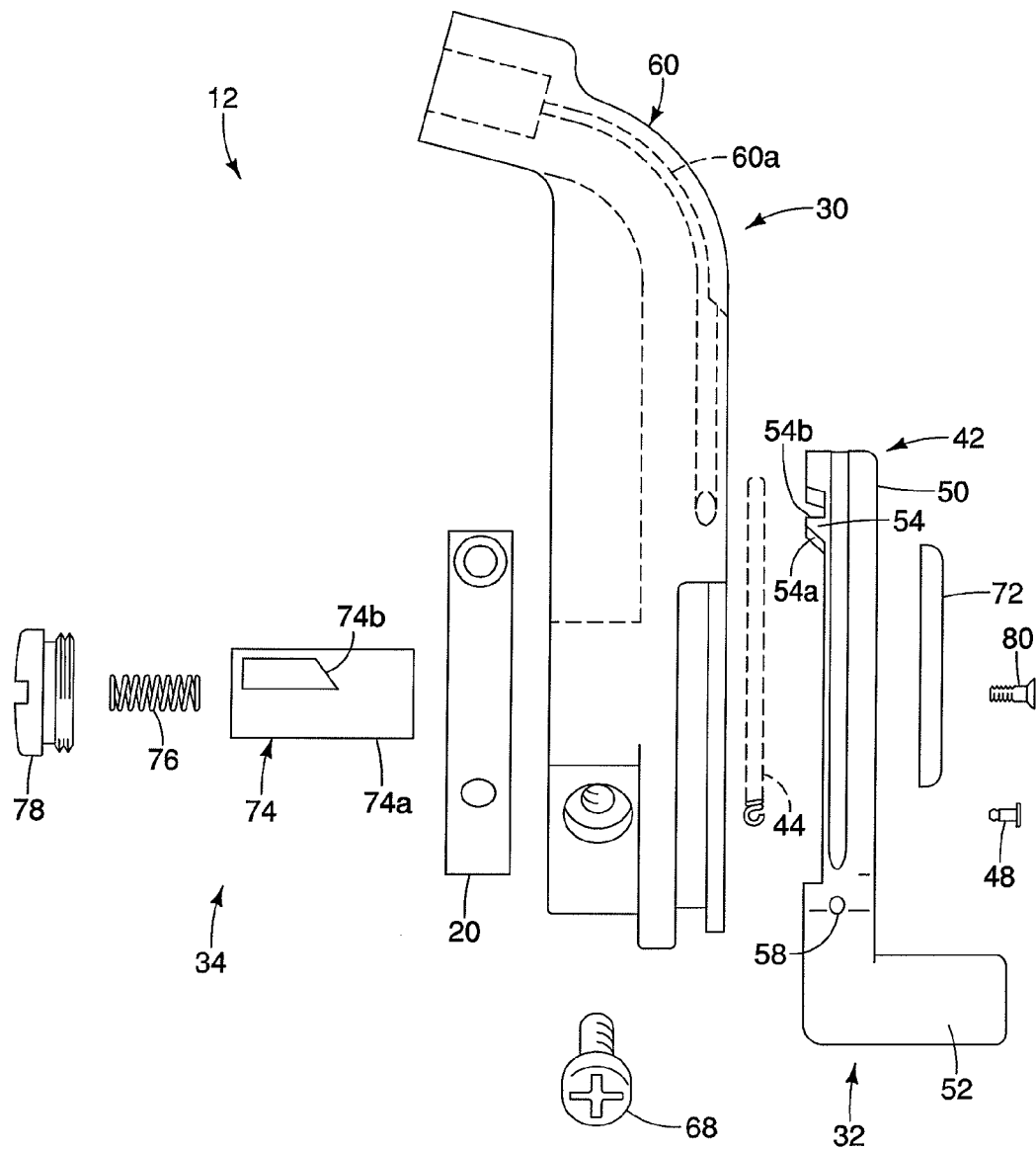
FIG. 9 is an exploded top plan view of the bicycle component actuating device illustrated in FIGS. 4 to 8.
Figure 10:
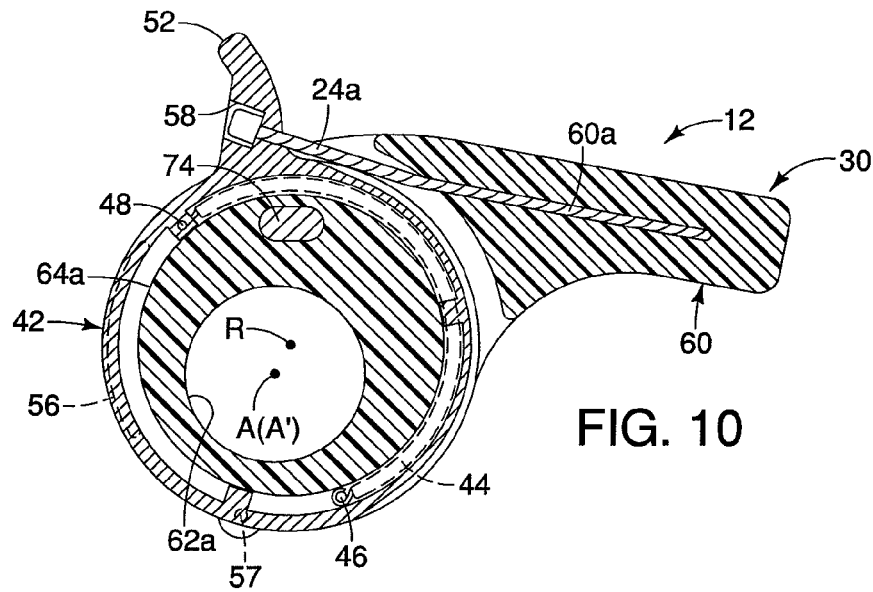
FIG. 10 is a cross sectional view of the bicycle component actuating device, with the first user operating member in a pre-assembled state.

As seen in FIGS. 5 and 6, the release mechanism 34 basically includes a second user operating member 72, a locking member 74, a biasing element 76 and a cap 78. Basically, the second user operating member 72 is movably mounted relative to the base member 30 for selective movement between a non-releasing (first) position and a releasing (second) position for selectively operating the locking member 74 to release the first user operating member 42 when moved from a non-releasing position to a releasing position. Generally, the second user operating member 72 is movably along an operating path $P_2$ that intersects with the first operating plane $P_1$ of the first user operating member 42. More specifically, the second user operating member 72 is movably along an operating path $P_2$ that extends laterally with respect to the first operating plane $P_1$ of the first user operating member 42. Preferably, the second user operating member 72 is linearly slidable along the operating path $P_2$. Further, preferably, the operating path $P_2$ of the second user operating member 72 is substantially parallel to the rotational axis R of the first user operating member 42.

The locking member 74 is movably mounted relative to the base member 30 for selective movement between a locking position to lock the first user operating member 42 in the second operating position and a releasing position to release the first user operating member 42 from the second operating position. The locking member 74 is movably along the operating path $P_2$ that intersects with the first operating plane $P_1$ of the first user operating member 42. Preferably, the locking member 74 is linearly slidable along the operating path $P_2$. Further, preferably, the operating path $P_2$ of the locking member 74 is substantially parallel to the rotational axis R of the first user operating member 42. The locking member 74 is urged to relative to the base member 30 to the locking position by the biasing element 76.

The locking member 74 basically includes a guide portion 74a and a locking portion 74. The second user operating member 72 is fastened to the guide portion 74a by a screw 80 so that the second user operating member 72 and the locking member 74 move together as an integrated unit. The guide portion 74a has a blind bore 74c that receives one end of the biasing element 76. The other end of the biasing element 76 contacts the cap 78 such that the locking member 74 biased into engagement with the ring shaped portion 50 of the first user operating member 42. Preferably, the biasing element 76 is a coiled compression spring that is preload when the locking member 74 is in the locking position.

Figure 14:
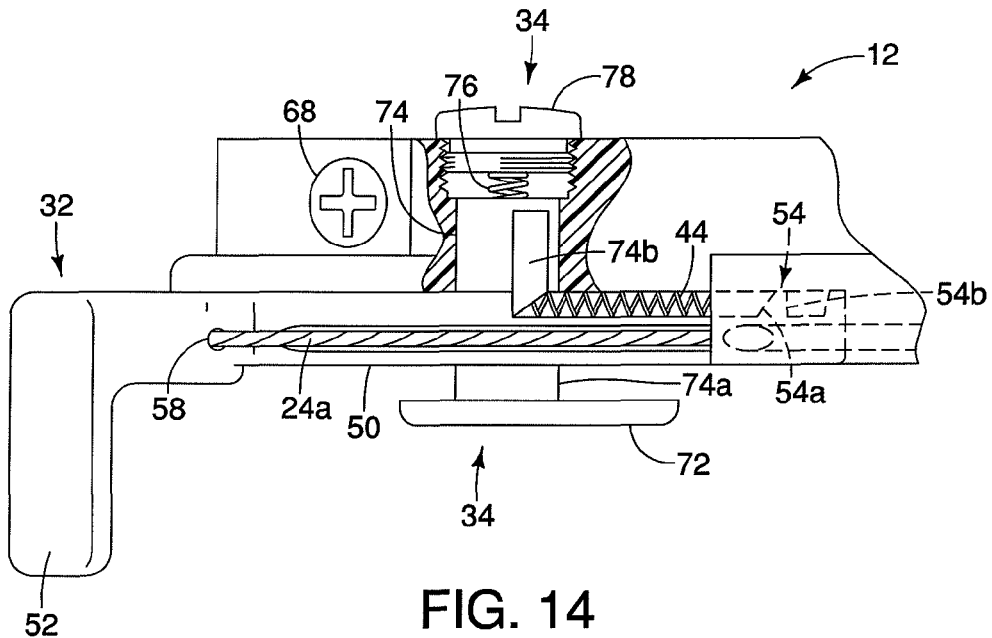
FIG. 14 is a top plan view of the bicycle component actuating device, with a portion broken away to reveal the release mechanism and with the first user operating member in a pre-assembled state.
Figure 15:
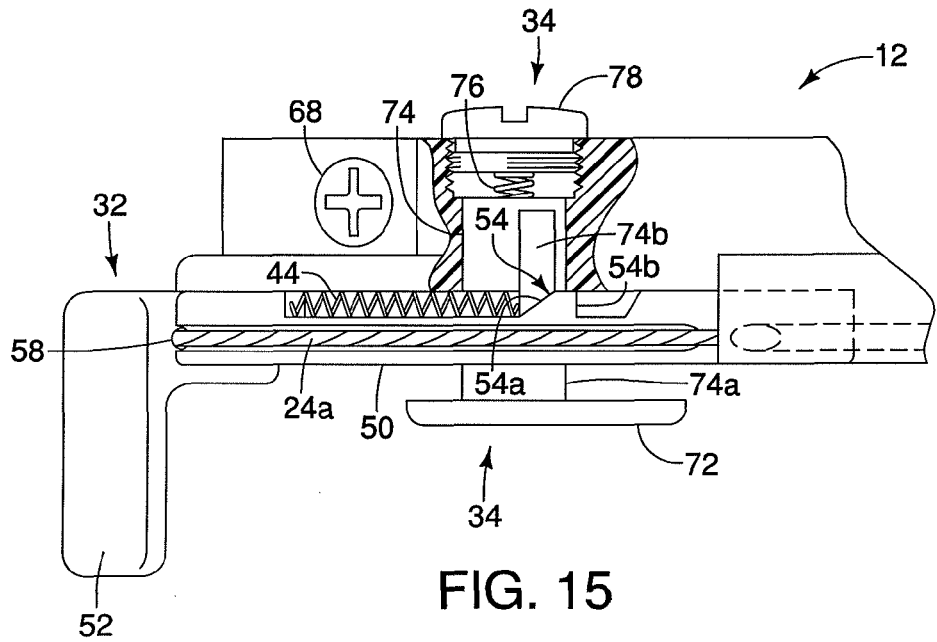
FIG. 15 is a top plan view, similar to FIG. 14, of the bicycle component actuating device, with a portion broken away to reveal the release mechanism and with the locking member initially contacting the cam surface of the projection of the first user operating member.
Figure 16:
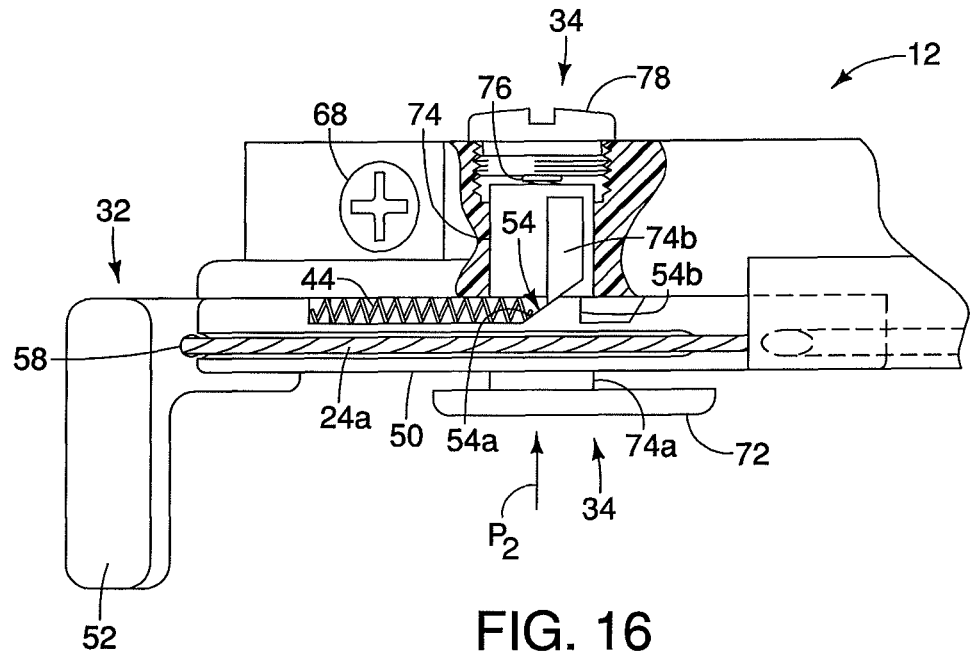
FIG. 16 is a top plan view, similar to FIGS. 14 and 15, of the bicycle component actuating device, with a portion broken away to reveal the release mechanism and with the locking member initially contacting the cam surface of the projection.

The locking portion 74 has an angled tip that engages the projection 54 of the first user operating member 42. In particular, as seen in FIGS. 14 and 15, the cam surface 54a of the projection 54 of the first user operating member 42 engages the angled tip of the locking portion 74 when the first user operating member 42 is rotated from the first operating position to the second operating position. As seen in FIG. 15, when the first user operating member 42 reaches the second operating position, the stop surface 54b of the projection 54 of the first user operating member 42 contacts the angled tip of the locking portion 74 to prevent the first user operating member 42 from returning to the first operating position due to the urging force of the biasing element 44. However, when the second user operating member 72 is pushed along path $P_2$, the angled tip of the locking member 74 moves out of engagement with the stop surface 54b of the projection 54 of the first user operating member 42. Now, the urging force of the biasing element 44 returns the first user operating member 42 to the first operating position.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component actuating device comprising:
    a base member;
    a first user operating member movably mounted relative to the base member for rotation between a first operating position and a second operating position about a rotational axis in a first operating plane that intersects with the rotational axis;
    a locking member movably mounted relative to the base member for selective movement between a locking position to lock the first user operating member in the second operating position and a releasing position to release the first operating member from the second operating position; and
    a second user operating member movably mounted relative to the base member for selective movement between a non-releasing position and a releasing position for selectively operating the locking member to release the first user operating member when moved from the non-releasing position to the releasing position,
    one of the locking member and the second user operating member being movable along an operating path that intersects with the first operating plane of the first user operating member.

2. The bicycle component actuating device according to claim 1, wherein
the base member includes a tube mounting structure having a tube receiving bore with a center mounting axis; and
the first user operating member moves along a curved path that at least partially encircles the center mounting axis.

3. The bicycle component actuating device according to claim 2, wherein
the center mounting axis of the tube mounting structure is offset from the rotational axis of the first user operating member.

4. The bicycle component actuating device according to claim 2, wherein
the center mounting axis of the tube mounting structure is parallel to the rotational axis of the first user operating member.

5. The bicycle component actuating device according to claim 2, wherein
the first user operating member includes a ring shaped portion and a user engagement portion extending from the ring shaped portion.

6. The bicycle component actuating device according to claim 1, wherein
the base member includes an inner wire guide structure and the first user operating member includes a wire attachment structure arranged relative to the inner wire guide structure of the base member such that an inner wire engages a peripheral surface of the first user operating member when the first user operating member is in the second operating position and the inner wire extends along the inner wire guide structure and is attached to the wire attachment structure.

7. The bicycle component actuating device according to claim 1, wherein
the first user operating member is biased relative to the base member to the first operating position by a biasing element.

8. The bicycle component actuating device according to claim 1, wherein
the locking member is urged relative to the base member to the locking position by a biasing element.

9. The bicycle component actuating device according to claim 8, wherein
the first user operating member includes a cam surface arranged to move the locking member against a biasing force of the biasing element when the first user operating member moves from the first operating position to the second operating position.

10. The bicycle component actuating device according to claim 9, wherein
the first user operating member is biased relative to the base member to the first operating position.

11. The bicycle component actuating device according to claim 1, wherein
the locking member is movable along the operating path that extends laterally with respect to the first operating plane of the first user operating member.

12. The bicycle component actuating device according to claim 11, wherein
the locking member is linearly slidable along the operating path.

13. The bicycle component actuating device according to claim 11, wherein
the operating path of the locking member is parallel to the rotational axis of the first user operating member.

14. The bicycle component actuating device according to claim 1, wherein
the second user operating member is movable along the operating path that extends laterally with respect to the first operating plane of the first user operating member.

15. The bicycle component actuating device according to claim 14, wherein
the second user operating member is linearly slidable along the operating path.

16. The bicycle component actuating device according to claim 14, wherein
the operating path of the second user operating member is parallel to the rotational axis of the first user operating member.

17. The bicycle component actuating device according to claim 1, wherein
the bicycle component actuating device is operatively coupled to a bicycle suspension.

18. The bicycle component actuating device according to claim 17, wherein
the first operating position corresponds to a suspension operating position and the second operating position corresponds to a suspension lockout position.

19. The bicycle component actuating device according to claim 17, wherein
the first operating position corresponds to a low spring-rate position and the second operating position corresponds to a high spring-rate position.

20. The bicycle component actuating device according to claim 17, wherein
the first operating position corresponds to a short stroke position and the second operating position corresponds to a long stroke position.

21. The bicycle component actuating device according to claim 1, wherein
the operating path lies in a second operating plane that intersects the first operating plane at an angle greater than zero.

* * * * *